United States Patent [19]

Takayama

[11] 4,186,415
[45] Jan. 29, 1980

[54] FACSIMILE COMPRESSION SYSTEM

[75] Inventor: Shoichiro Takayama, Tokyo, Japan

[73] Assignee: Oki Electric Industry Co., Ltd., Tokyo, Japan

[21] Appl. No.: 844,531

[22] Filed: Oct. 25, 1977

[30] Foreign Application Priority Data

Oct. 29, 1976 [JP] Japan ............................. 51-129378

[51] Int. Cl.² ............................................... H04N 7/12
[52] U.S. Cl. .................................... 358/260; 358/261
[58] Field of Search ...................... 358/260, 261, 257

[56] References Cited

U.S. PATENT DOCUMENTS

| | | | |
|---|---|---|---|
| 4,047,228 | 9/1977 | Yagishita | 358/261 |
| 4,056,828 | 11/1977 | Furuta | 358/261 |
| 4,057,834 | 11/1977 | Nakagome | 358/261 |

*Primary Examiner*—Howard W. Britton

*Attorney, Agent, or Firm*—Frailey & Ratner

[57] ABSTRACT

A facsimile signal is compressed by skipping the continuous white cells longer than a predetermined length, and the compressed facsimile signal is transmitted in an analog form. When some portion of a facsimile signal is deleted due to the absence of a black cell in said portion, an f-signal indicating the deletion of said portion is inserted at the head of the deleted portion. The amplitude of the f-signal is twice as high as the highest level of a picture signal thus a reception station can differentiate the f-signal from a picture signal. The compressed facsimile signal is modulated to an AM.PM.VSB signal (Amplitude Modulation-Phase Modulation-Vestigial Side Band Modulation), and is transmitted to a communication line. When the reception station recognizes said f-signal, a predetermined number of white cells are inserted automatically on a printing paper at the reception station.

5 Claims, 12 Drawing Figures

| R L | RL CODE |
|---|---|
| 1 ~ 4 | □ × × |
| 5 ~ 16 | □ × × □ × × |
| 17 ~ 64 | □ × × □ × × □ × × |
| 65 ~ 256 | □ × × □ × × □ × × □ × × |
| 257 ~ 1024 | □ × × □ × × □ × × □ × × □ × × |
| 1025 ~ 4096 | □ × × □ × × □ × × □ × × □ × × □ × × |

Fig. I(A) PRIOR ART

| R L | RL CODE |
|---|---|
| 1~4 | □ × × |
| 5~16 | □ × × □ × × |
| 17~64 | □ × × □ × × □ × × |
| 65~256 | □ × × □ × × □ × × □ × × |
| 257~1024 | □ × × □ × × □ × × □ × × □ × × |
| 1025~4096 | □ × × □ × × □ × × □ × × □ × × □ × × |

Fig. I(B) PRIOR ART

| SYC | 0 0 1 0 1 1 | ---- | P₃ | P₅ | P₆ | Pᵢ | -- |

———IND———

FACSIMILE COMPRESSION SYSTEM

BACKGROUND OF THE INVENTION

The present invention relates to a facsimile compression system, in particular, relates to a facsimile compression system which transmits the picture information in an analog form.

In order to reduce the transmission time of a picture in a facsimile system, many facsimle compression system in which a large white area in a transmission picture is not scanned but only areas having both the white and black cells are scanned, have been proposed. Some of them are run length coding system (a first order run length coding, a second order run length coding), a relative address coding system, and a white picture skip system. In a run length coding system, the continuous length of white cells or black cells is coded in a binary form and then the code is transmitted instead of a scanned signal. FIG. 1(A) shows the example of the run length system, in which the symbol "□" is "1" for black cells and is "0" for white cells, and the symbol "xx" indicates the binary code showing the continuous length of white or black cells. For instance, when three black cells continue, the scanned signal is coded to "111". In a relative address coding system, each cell is coded considering the comparison with the corresponding cell on the nearest preceeding scanning line. In a white picture skip system, each scanning line is divided into a plurality of sections, and when a specific section has no black cell, that is to say, all the cells in the section are white, that section is not transmitted, and is skipped. In order to indicate the skipped sections, an indicator block is inserted preceeding the picture sections as shown in FIG. 1(B). In FIG. 1(B), SYC is the synchronization code which is placed at the head of each scanning line. IND is the indicator block showing whether or not each picture section is skipped. In the example of FIG. 1(B), the first two bits in the indicator block are "0", so the first two picture sections are skipped and are not transmitted. The third bit of the indicator block is "1", so the third picture section "P3" is not skipped and is transmitted in an anolog form. The fourth section is skipped, the fifth and sixth sections are transmitted.

However, in a prior facsimile compression system described above, all of the information, or at least a part of it, is transmitted in a digital form since the compressed signal is coded in a binary form. Accordingly, when a facsimile signal is transmitted through a telephone line, a digital modem (modulator and demodulator) must be installed. Further, a transmission error of only a single bit would cause a large error on the specific scanning line, or even a plurality of adjacent scanning lines at a receiving station, as the signal is transmitted in a coded form. It should be appreciated that if a signal is transmitted in an analog form, a single error would cause a small spot of noise at a receiving station. Accordingly, a high quality transmission line must be utilized for the transmission of compressed facsimile signals, thus the transmission modem must be of high quality assuring an error rate of $10^{-4}$ or $10^{-5}$, which is almost the same as for the data transmission system. Therefore, when a high transmission speed like 4800 baud is utilized, the transmission cost becomes considerably high. In the case of a white picture skip system, an error in an indicator block will completely disturb the picture quality and the system can not even be synchronized. Further, although we intend to use an analog type modem instead of digital type modem for the transmission of a compressed facsimile signal, the transmission speed must be considerably lowered for assuring a small transmission error. Therefore, an analog type modem is useless for a prior compressed facsimile signal.

SUMMARY OF THE INVENTION

It is an object, therefore, of the present invention to overcome the disadvantages and limitations of a prior facsimile compression system by providing a new and improved facsimile compression system.

The above and other objects are attained by a facsimile compression system comprising the steps of reading a picture information of an original by a whole scanning line, storing said picture information in a first memory, dividing said picture information of a whole scanning line into a plurality of sections, detecting a black cell in each section, storing the binary information concerning whether each section has a black cell in a second memory, selecting either a picture information or an f-signal for each sections according to the content of said second memory, editing a facsimile signal having a synchronization signal at the beginning of each scanning line, a picture information for each section having a black cell, and an f-signal for sections having no black cell, and modulating the facsimile signal with an AM.PM.VSB system, and transmitting the modulated signal to a reception station through a communication line.

BRIEF DESCRIPTION OF THE DRAWINGS

The foregoing and other objects, features, and attendant advantages of the present invention will be appreciated as the same become better understood by means of the following description and accompanying drawings wherein;

FIG. 1(A) is a drawing showing the example of a code of a run length system in a prior art;

FIG. 1(B) shows the data format of the prior facsimile system using a white picture skip system;

DETAILED DESCRIPTION OF THE PREFERRED EMBODIMENTS

According to the present invention, the compressed facsimile signal is supposed to be modulated by an AM.PM.VSB system, in which the signal is first modulated by amplitude modulation, next the modulated AM signl is modulated by phase modulation (0-phase and $\pi$-phase), and finally the AM-PM modulated signal is modulated by VSB (Vestigial Side Band) modulation.

Figure 2A:
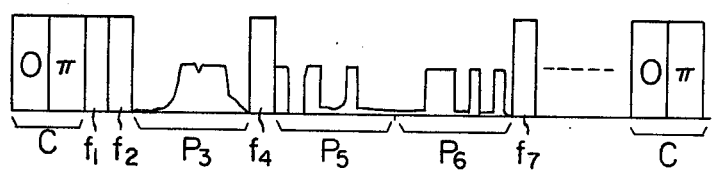
FIGS. 2(A) through 2(E) are signal format showing the transmission signal of the compressed facsimile signal according to the present invention.

FIG. 2(A) shows the signal format of the compressed facsimile signal of the first embodiment according to the present invention. In FIG. 2(A), it is supposed that each scanning line is divided into a plurality of sections, each having a plurality of cells and the first, second, fourth and seventh sections have no black cells, and the third, fifth, and sixth sections have at least a single black cell. Accordingly, the former sections (first, second, fourth, and seventh sections) are not transmitted but are skipped. And the latter sections (third, fifth, and sixth sections) are transmitted as they stand. In FIG. 2(A), the symbol C shows the synchronization block positioned at the head of each scanning line. The amplitude of the synchronization block C is about twice of that of the white level, and the phase in the synchronization block is changed at the center of the block from 0-phase to $\pi$-phase, and the instant of the change of the phase is supposed the start mark of a scanning line. When a section has no black cell, that section is skipped and an f-signal indicating that the section is skipped is transmitted. The f-signal has the same amplitude as the synchronization block, and the duration of the f-signal is about half that of the synchronization block. The synchronization signal and the f-signal can be transmitted slower than the picture signal to decrease the transmission error. In FIG. 2(A), since the first and second sections have no black cells, those sections are skipped, and instead, a pair of f-signals $f_1$ and $f_2$ are transmitted indicating the skip of the first and second sections. It should be appreciated that the double f-signals $f_1$ and $f_2$ having the double width show that two continuous sections are skipped. In FIG. 2(A), the third, fifth and sixth sections have at least a single black cell, so those sections are not skipped, but picture signals $P_3$, $P_5$ and $P_6$ are transmitted in an analog form. The upper limit of the picture signal which relates to the white level is about half of the f-signal.

Figure 2B:
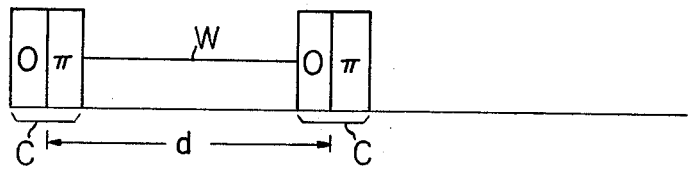

FIG. 2(B) shows another signal format according to the present invention. In FIG. 2(B), the whole length of the scanning line, including all the sections on that scanning line, is white, and has no black cell. In this case, the white level signal W is transmitted just after the synchronization signal, until the next synchronization signal, and the white level signal W continues for the time (d), which is predetermined according to the transmission time between the transmission station and the reception station, for instance, d=10mS.

Figure 2C:
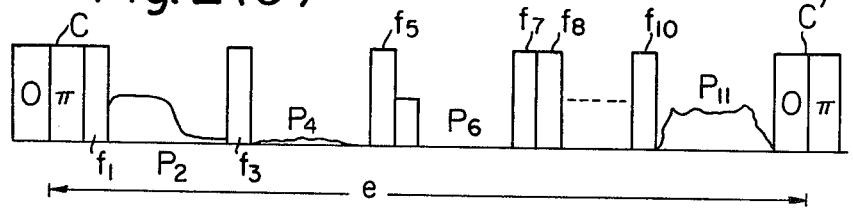

FIG. 2(C) shows another signal format according to the present invention, in which the second, the fourth, the sixth, and the eleventh sections have picture information, but the rest of the sections to the right of the eleventh section are white. In this case, a white skip signal (f-signal) is not transmitted for the twelfth section but the next synchronization signal C' is directly transmitted just after the eleventh section. The duration (e) between the synchronization signal C and C' must be longer than the said predetermined length (d). The embodiment of FIG. 2(C) is very effective when the paper width in the reception station is different from that in the transmission station. In a prior art, when the paper width is different, the transmission station must send the specific command signal indicating the difference of the paper width for adjustment at the receprion station.

Figure 2D:
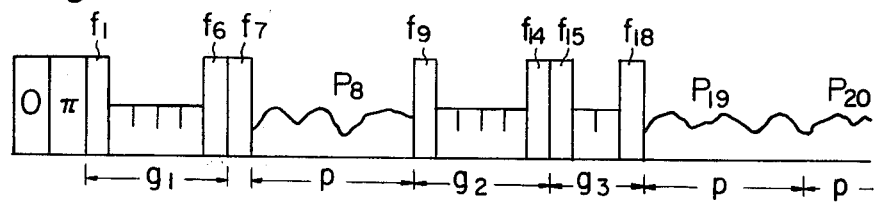

FIG. 2(D) shows another signal format according to the present invention, in which when more than three white skip signals (f-signals) continue, the amplitude of the f-signals excluding the first and the last, are the same as that of the white level, which is half of the ordinary f-signal. By lowering the amplitude of the intermediate f-signals, the average transmission level and/or the average transmission power can be lowered. It should be appreciated that the low average power is preferable for a transmission line and apparatus. In FIG. 2(D), the sections 1 through 6, 7, 9 through 14, and 15 through 18 are white, so the amplitude of the f-signals $f_2$, $f_3$, $f_4$, $f_5$, $f_{10}$, $f_{11}$, $f_{12}$, $f_{13}$, $f_{16}$ and $f_{17}$ is half of that of the ordinary amplitude of the f-signal. The duration $g_1$, $g_2$, or $g_3$ between the first f-signal and the last f-signal must be shorter than the duration p of a picture section. When the f-signals continue longer than the duration p of a picture signal, a pair of f-signals having the ordinary amplitude must be inserted in every duration shorter than p.

Figure 2E:
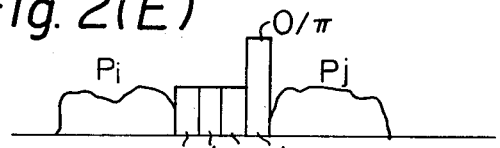

FIG. 2(E) shows another signal format according to the present invention, in which a number of white sections are coded by a plurality of preceeding white level bits a, b, c, and the ordinary f-signal d. Each bit a, b, c, and d are coded in binary mode either in amplitude (white level and f-level), or phase modulation (0-phase and $\pi$-phase). The embodiment of FIG. 2(E) is effective when large number of white sections continue.

It should be appreciated that some modification of the signal format in FIGS. 2(A) through 2(E) is possible within the spirit of the present invention. For instance, a keyed AGC signal having the white level of amplitude can be inserted just after the synchronization signal for Automatic Gain Control (AGC) of a reception station.

Figure 3A:
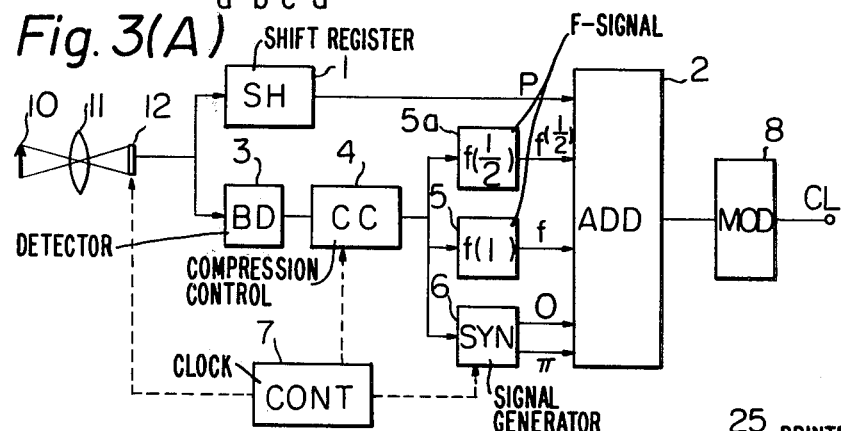
FIGS. 3(A) and 3(B) show the block diagrams of the transmitter and the receiver according to the present invention.

FIG. 3(A) shows the block diagram of the transmission station according to the present invention. In FIG. 3(A), picture cell 10 is read by the sensor 12 through the lens 11, and the sensor 12 converts the light signal to an electric signal. The output of the sensor 12 is applied to the shift-register 1 and the black cell detector 3. The shift-register 1 has a plurality of bit positions, the number of which is the same as that of the cells in a single scanning line. The black cell detector 3 detects a black cell in each section (for instance, each section has 32 bits), and the output of the black cell detector 3 is applied to the compression control 4, which controls the operation of the shift-register 1, the f-signal generators 5 and 5a, and the synchronization signal generator 6. The reference numeral 2 is an adder, which adds the signal from the shift-register 1, the f-signal generators 5 and 5a, and the synchronization signal generator 6, and the output of the adder 2 is transmitted to a communication line through the modulator 8, which modulates the signal to an AM.PM.VSB signal. The reference numeral 7 is a clock circuit for providing a clock pulse to every circuit in the apparatus. It should be appreciated that the function of the compression control 4, the f-signal generator 5 and 5a and the synchronization signal generator 6 can be replaced by a micro-computer.

Figure 3B:
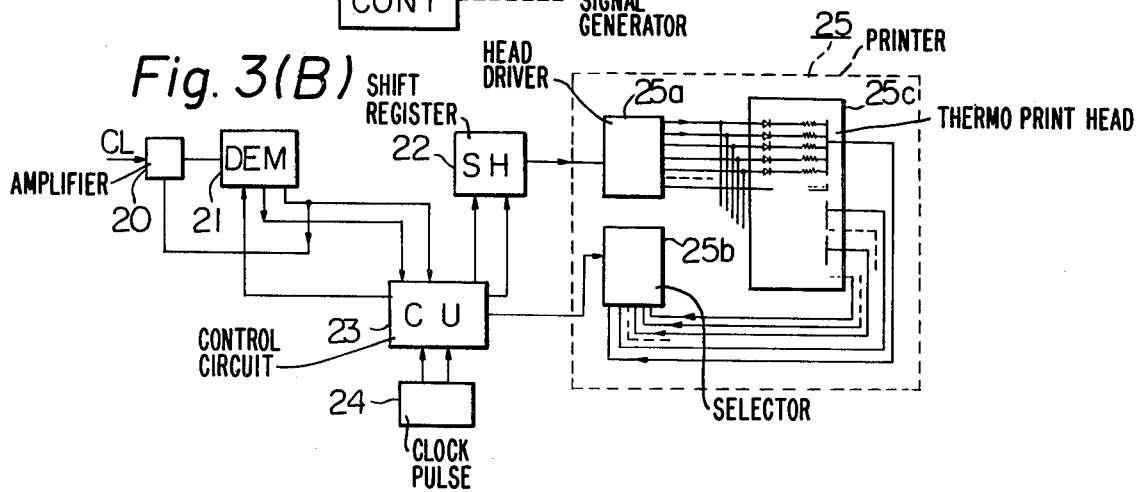
Figure 4A:
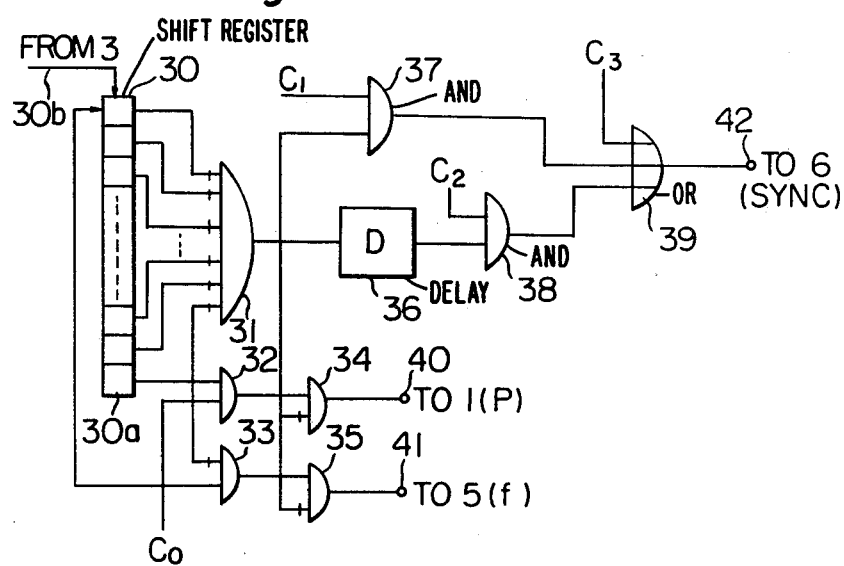
FIG. 4(A) is the detailed block diagram of the compression control 4 in FIG. 3(A)
Figure 4B:
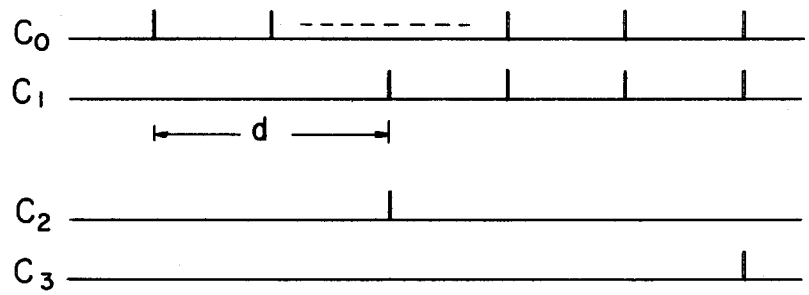
FIG. 4(B) is the time chart showing the operation of FIG. 4(A)

FIG. 3(B) is the block diagram of the reception station according to the present invention. The received signal through the communication line CL is applied to the demodulator 21 through the amplifier 20. The amplifier 20 is so controlled that the negative feed back signal is not fed to the amplifier when the de-modulator 21 detects the double voltage signals (f-signal and synchronization signal). The de-modulator 21 detects the double voltage, the zero-cross signal by the inversion of 0-phase and $\pi$-phase, and the picture signals, and the output of the de-modulator 21 is applied to the control unit 23. The control unit 23 differentiates the synchronization signal, f-signal and the picture signals and reproduces the picture signals in every section (for instance, each section has 32 bits). The reproduced section is applied to the shift-register 22, which has the capacity of the whole scanning line. The output of the shift-register 22 is applied to the printer 25. The printer 25 in the present embodiment is a thermo-printer, in which the colour of the thermo-paper is changed by the heat generated by a thermo-head and a picture or a character is printed by the change of the colour of the paper on the principle of dot matrix printing. In FIG. 3(B), 25a is a head driver circuit for applying power to the thermo-print head 25c, which is driven by specifying the print group having 32 cells. The operation of the selector 25b is controlled by the control unit 23. The reference numeral 24 is a clock pulse circuit. It should be appreciated that the function of the control unit 23 can be replaced by an ordinary micro-computer. FIG. 4(A) shows the detailed block diagram of the compression control 4 in FIG. 3(A) and FIG. 4(B) is the time chart showing the operation of FIG. 4(A). In FIG. 4(A), the reference numeral 30 is a second shift register storing the information as to whether or not each section has any black cells. Each bit of the register 30 corresponds to each section, and when a specific section has at least one black cell, the corresponding bit of the register 30 is set to one through the line 30b by the output of the black cell detector 3. The reference numeral 31, 32, 33, 34, 35, 37 and 38 are AND-circuits, 36 is a delay circuit having the delay time (d), 39 is an OR-circuit, and $C_0$, $C_1$, $C_2$, $C_3$ are timing signals.

When the register 30 is filled with information indicating the presence of a black cell in each section, the condition of the first bit 30a shows the presence of a black cell in the first section, and since the content of each bit of the register 30 is shifted by one bit in every section being transmitted, the bit 30a shows the presence of a black cell in the section just being transmitted. When the content of the bit 30a is one, the output appears at the terminal 40 through the AND circuits 32 and 34 at the timing $C_0$, and said output at the terminal 40 is applied to the first shift register 1 (FIG. 3(A)) causing the transmission of a picture section. When the content of the bit 30a is zero, the output appears at the terminal 41 through the AND circuits 33 and 35, and said output at the terminal 41 is applied to the f-signal generator 5 causing the transmission of f-signal at the timing $C_0$. The timing pulse $C_0$ is also applied to the register 30 which is shifted by one bit to the bottom. The above operation is repeated and a picture signal or f-signal is transmitted according to the presence or absence of a black cell in each section, and upon completion of the transmission of the complete scanning line, the timing pulse $C_3$ causes the synchronization signal generator 6 to transmit the synchronization signal through the OR circuit 39 and the terminal 42. Thus, the operation shown in FIG. 2(A) is performed.

When all sections in a whole scanning line have no black cell, the OR circuit 31 provides output, which is applied to the AND circuit 38 through the delay circuit 36 whose delay time is d. The AND circuit 38 provides the output at the timing $C_2$ and said output is applied to the synchronization signal generator 6 through the OR circuit 39 and the terminal 42, thus the operation shown in FIG. 2(B) can be performed.

When the rest of all the sections have no black cells, the OR circuit 31 also provides output which is applied to the AND circuit 37. The AND circuit 37 provides output when both the output of the OR circuit 31 and the timing pulse $C_1$ are applied to the AND circuit 37. As apparent from FIG. 4(B), the timing pulse $C_1$ appears in every section after the time d has elapsed from the beginning of the scanning line. Thus, the operation of FIG. 2(C) is accomplished. It is clear that some attachments obvious to those skilled in the art to FIG. 4(A) provide the operation shown in FIG. 2(D) and FIG. 2(E).

Figure 5:
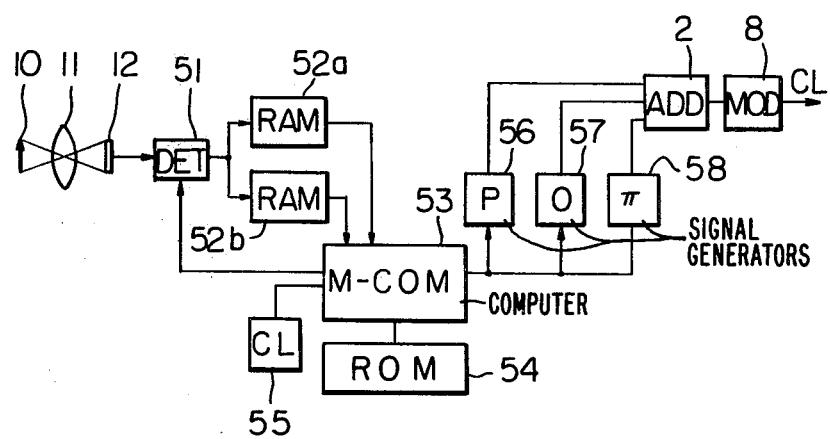
FIG. 5 is the block diagram of the other embodiment of the transmitter according to the present invention.

FIG. 5 shows another embodiment of the transmission station according to the present invention. In FIG. 5 the output of the sensor 12 is applied to either random access memory 52a or 52b, which stores the picture information alternately. That is to say, when the memory 52a is storing the picture information from the sensor 12, the other memory 52b is forwarding the signal to the communication line, and when the memory 52a sends the information to the communication line, the memory 52b receives the output of the sensor 12. 51 is a flag detector. The outputs of the memories 52a and 52b are applied to the microcomputer 53, which is controlled by the read only memory 54 and the clock pulse generator 55. The read only memory 54 is programmed to control the computer 53 as shown in FIGS. 2(A) through 2(E). The computer 53 triggers either the picture signal generator 56, the 0-phase signal generator 57, or the $\pi$-phase signal generator 58. Those generators selectively generate a picture signal, synchronization signal or f-signal, and the outputs of those generators are applied to the communication line through the adder 2 and the modulator 8.

As apparent from the above explanation, the present invention can accomplish data compression in a facsimile system using an analog modem. According to the present invention, the synchronization system and the white section skip system are very simple, so high speed transmission, three times as high as a prior art, can be accomplished. Further, the synchronization in the present invention is very stable, and the present facsimile system can be applicable to the system in which the paper width in a reception station is not the same as that in a transmission station.

From the foregoing it will now be apparent that a new and improved facsimile compression system has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A facsimile compression method comprising the steps of reading picture information of an original by a whole scanning line, storing said picture information in a first memory, dividing said picture information of a whole scanning line into a plurality of sections, detecting a black cell in each section, storing the binary information concerning whether each section has a black cell in a second memory, selecting either picture information or an f-signal for each section having no black cell according to the content of said second memory, editing a facsimile signal having a synchronization signal at the beginning of each scanning line, a picture information for each sections having a black cell, and an f-signal for sections having no black cell, and modulating the facsimile signal with an AM.PM.VSB system, and transmitting the modulated signal to a reception station through a communication line.

2. A facsimile compression method according to claim 1, wherein, when a plurality of continuous f-signal appear, the amplitude of said f-signals excluding the first and the last, is limitted to half of that of the first and the last f-signals.

3. A facsimile compression method according to claim 1, wherein when the rest of all the sections have no black cell after transmitting some sections, the synchronization signal of the next scanning line is transmitted on the condition that the duration between two adjacent synchronization signals is longer than a predetermined time.

4. A facsimile compression method according to claim 1, wherein the amplitude of the synchronization signal and f-signal is twice as high as the carrier level, and those signals are transmitted in the considerably slower speed than the picture signal.

5. A facsimile compression system comprising a sensor for reading scanning information of an original, a first memory for storing said scanning information by a whole scanning line, a black cell detector for detecting whether each section in a scanning line has any black cells, a compression control having a second memory for storing the binary information applied from said black cell detector, an f-signal generator indicating that a section has no black cell, a synchronization signal generator, an adder for selectively adding the outputs of said first memory, said f-signal generator and said synchronization signal generator, a modulator for modulating the output of said adder by an AM.PM.VSB system and sending the modulated signal to a communication line, and said second memory being arranged to selectively trigger either the said first memory, the f-signal generator or the synchronization signal generator according to the presence of a black cell in each section.

* * * * *